3,293,326
DYEABLE INTERPOLYMERS CONSISTING OF ALPHA-OLEFINS AND A NITROGEN CONTAINING COMPOUND
James L. Jezl, Swarthmore, and Habet M. Khelghatian, Springfield, Pa., assignors to Sun Oil Company, Philadelphia, Pa., a corporation of New Jersey
No Drawing. Filed July 6, 1965, Ser. No. 469,845
18 Claims. (Cl. 260—878)

The present application is a continuation-in-part of application Serial No. 36,727, filed June 17, 1960, now abandoned.

This invention relates to novel interpolymers of alpha-olefins and terminally unsaturated alkenyl amines, and a method of preparing the same. More particularly, this invention relates to polymers prepared from the above described monomers which possess unique dyeing properties.

The catalytic polymerization of alpha-olefins to homopolymers and interpolymers has been described heretofore. A catalyst system which is especially effective for such polymerization reactions is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. The reaction product acts as a catalyst for polymerizing the alpha-olefin to solid polymers. If desired, a lower halide such as titanium trichloride can be preformed, dispersed in an inert liquid, and an activator such as an aluminum trialkyl added. In performing the polymerization step, the monomer is contacted with the solid catalyst, such as by passing the alpha-olefin into the liquid reaction mixture, and is thereby polymerized to solid polymers. Substantially anhydrous and oxygen-free conditions are used throughout the process, since the catalyst is deactivated by contact with water or oxygen.

Polymers heretofore prepared by the foregoing procedure have been found to be useful in many applications; however, they are not always suitable for use in certain other applications. Thus polyethylene and polypropylene have been used as films and coatings because of their superior moisture vapor impermeability. Moreover, both polyethylene and polypropylene have been utilized in a wide variety of articles prepared by molding techniques, as by compression or injection. Still further, both polyethylene and polypropylene have found use in the form of fibers.

In many of these applications the relative inertness of these polymers is very useful. However, this property of relative chemical nonreactivity makes it most difficult to incorporate pigments, dyes or inks therewith. Thus it is well known that ordinary inks "bleed" when applied to polyethylene or polypropylene films or coatings. In a similar manner it has been found that fast colors are virtually impossible to obtain with the poly-alpha-olefins, such as polyethylene or polypropylene, when one attempts to use ordinary pigments or dyes.

It is therefore an object of the present invention to provide interpolymers of at least one alpha-olefin and at least one terminally unsaturated alkenyl amine. It is a further object to provide interpolymers which contain reactive side chains which act as coupling units in providing adherence of pigments, dyes or inks in, or to, objects formed therefrom. It is another object of the present invention to provide a process for preparing polymeric compositions which are pigmentable, dyeable and printable. Other objects in accordance with this invention will be apparent hereinafter.

It has now been found that dyeable, pigmentable or printable polymers of alpha-olefins can be prepared by polymerizing an alpha-olefin with a terminally unsaturated alkenyl amine. These polymers are prepared by polymerizing an alpha-olefin in the presence of a terminally unsaturated alkenyl amine and a catalyst dispersion, in an inert liquid hydrocarbon medium, of a metal subhalide of a metal of Group IVa, Va or VIa of the Periodic Table in combination with a polymerization activator in the same manner as described in Gaylord et al,. infra. By "subhalide" is meant a halide of one of said Group IVa, Va or VIa metals wherein said metal is in a valence state which is lower than its highest valence state. The Periodic Table referred to herein is that of Mendeleeff as illustrated by the "Handbook of Chemistry and Physics," 29th edition, 1945, Chemical Rubber Publishing Co., pages 312 and 313, part "a" of a group dealing with those materials appearing at the left side of a column, and part "b" appearing at the right side of a column.

Several methods of preparing the novel polymers of this invention are contemplated herein. Thus in an embodiment, (1), the catalyst components, i.e., the metal subhalide and the polymerization activator, are combined with the terminally unsaturated alkenyl amine, and these components are then caused to react under polymerization conditions in a polymerization reaction vessel for a period of time of sufficient length to produce a low molecular weight polymer of the terminally unsaturated alkenyl amine. After preparing this low molecular weight polymer and while it is still in a living state, an alpha-olefin is introduced into the polymerization reactor and polymerization is continued. This method produces a block polymer wherein the initial low molecular weight polymer of the terminally unsaturated alkenyl amine is connected to a polymer chain of the alpha-olefin. Although the usual hydrocarbon medium can be introduced into the reaction zone along with the amine and the catalyst components, in a preferred embodiment, little or no hydrocarbon medium is introduced into the reaction zone until the alpha-olefin is introduced thereinto.

In another embodiment of this invention, (2) the catalyst components are mixed together in the hydrocarbon medium, and the alpha-olefin and the terminally unsaturated alkenyl amine are introduced into the polymerization vessel and simultaneously reacted under polymerizing conditions. This method produces a copolymer of the alpha-olefin and the terminally unsaturated alkenyl amine.

In still another embodiment of the present invention, (3), the alpha-olefin is polymerized in the presence of the foregoing catalyst components in the foregoing reaction medium to a molecular weight which is generally desirable for polyalpha-olefins (i.e., about 50,000 to 850,000 by light scattering). At this point the terminally unsaturated alkenyl amine is introduced and polymerization is continued to form a terminal block polymer wherein a polymeric chain of the alpha-olefin is connected by its living terminal end to the living terminal end of a low molecular weight polymer of the terminally unsaturated alkenyl amine.

Various modifications of each of these three methods are included in this invention. Thus, composite procedures derived from methods (1), (2) and (3) are useful according to this invention. In one instance, methods (1) and (2) are combined by first forming an initial polymer block of the terminally unsaturated alkenyl amine followed by interpolymerization of a mixture of the alpha-olefin and the terminally unsaturated alkenyl amine forming an amine-"initial block": amine-olefin copolymer. Combined in the same manner, methods (2) and (3) result in an amine-olefin copolymer: amine-"terminal block" polymer. Similarly, methods (1), (2)

and (3) are combined to produce an amine-"initial block": amine-olefin copolymer: amine-"terminal block" polymer. In a further modification, a mixture of alpha-olefins and/or a mixture of terminally unsaturated alkenyl amines are interpolymerized by the above described methods.

Titanium trichloride is a preferred catalyst of this invention, but other halides of the metals of Groups IVa, Va and VIa of the Periodic Table are also used in its stead. Thus, a halide of titanium, zirconium, hafnium, vanadium, niobium, chromium, molybdenum or tungsten is suitable as one component of the catalyst system herein. Although the chloride of one of the foregoing metals is generally preferred, the iodide, bromide or fluoride of one of these metals is usable in its place. In any event, the metal of the metal halide is most generally in a valence state other than its highest valence state. The reduction of one of these metal halides, such as titanium tetrachloride, can be accomplished by any convenient means. For example, an aluminum trialkyl is frequently used as the reducing agent; other reducing procedures are used also, such as by contacting the metal halide with hydrogen or with a dispersion of an alkali metal in an inert solvent.

Additionally, it is necessary that an activator be present with the metal halide; thus, an aluminum alkyl is sometimes used both as a reducing agent and as the activator component of the catalyst system. On the other hand, a prereduced halide, such as titanium trichloride or titanium dichloride, together with an activator, gives excellent results. In addition to the aluminum trialkyls, the activator for the metal halide includes other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process of this invention, and, in fact, constitute preferred embodiments thereof, but metal alkyls having up to about 12 carbon atoms in the alkyl groups thereof are used according to this invention with good results. Alkali metal alkyls such as n-butyl lithium, methyl sodium, n-butyl sodium, phenyl isopropyl potassium and the like, illustrate other metal alkyls which give good results in this process. Metal hydrides which are used according to this invention as activators include lithium hydride, lithium aluminum hydride, potassium hydride and sodium hydride. Metal borohydrides, such as sodium borohydride and potassium borohydride, are illustrative of borohydrides which are used. Alkyl metal halides include Grignard reagents, such as methyl magnesium bromide, ethyl magnesium chloride, phenyl magnesium bromide, and the like, as well as alkyl aluminum halides such as diethyl aluminum chloride, ethyl aluminum dichloride and the like.

The quantities of catalytic components can be varied over a relatively wide range. Thus a mol ratio of metal halide to activator of from 1:10 to 10:1 gives good results, whether the metal halide is pre-reduced or reduced by the activator. The total quantities used are preferably such that a light slurry of solid in the liquid phase is obtained which is agitable with ease. Generally about one part by weight of catalyst particles to from about 30 to 1,000 or more parts by weight of the inert reaction medium, or polymerizable monomer in liquid form, gives good results.

Saturated hydrocarbons such as the hexanes, heptanes, octanes, decanes, cyclopentanes, cyclohexanes, decahydronapthalene, mixtures thereof and the like, which are liquid under the conditions of reaction, are preferred reaction media according to this invention except as pointed out above; other known liquid hydrocarbons are useful also, such as tetrahydronaphthalene. An alpha-olefin, or mixtures of alpha-olefins, and a terminally unsaturated alkenyl amine are introduced into the catalyst slurry, for example, by dispersing the liquid alkenyl amine, and bubbling propylene or other normally gaseous olefin in the gaseous phase, into the catalyst slurry, or by dispersing with agitation a liquid alpha-olefin into the catalyst slurry with a liquid alkenyl amine. If desired, the gaseous or liquid alpha-olefin as well as the alkenyl amine can be dissolved in a hydrocarbon which is preferably the same as the reaction medium, and the resulting solution contacted with the catalyst slurry. The polymerization reaction is then performed under polymerizing conditions, including a temperature within the range of from about 0° C. to 250° C. and a pressure from atmospheric to about 5,000 p.s.i.g. or more, it generally being necessary that the reaction medium be maintained in the liquid phase.

After completion of the polymerization step, a catalyst deactivating material is added to the reaction mixture. If a relatively large quantity of inert reaction medium has been used in the polymerization step, it is advantageously separated from the polymer by draining prior to the introduction of the catalyst deactivator. Water, a relatively low molecular weight alcohol, such as methanol, ethanol, propanol, or isopropanol, or mixtures of the same is a preferred catalyst deactivator. Contacting the polymer with the catalyst deactivator is preferably performed with an agitation means which chops or comminutes the polymer so that catalyst particles coated by, or embedded in, the polymer are exposed to the action of the deactivator. After removing the deactivator by draining or filtering, in a preferred embodiment, an additional quantity of deactivator is added and the solid material again comminuted. This treatment may be performed once or several times, following which the polymer is filtered and the remaining pentane-soluble polymer is removed by dissolution and filtering, or by some other separation means.

As illustrated by Gaylord et al., infra, the monomers polymerizable by the coordination complex catalyst systems defined herein are both gaseous and liquid. In addition to propylene mentioned above, ethylene, 1-butene, allene, butadiene and 1,4-pentadiene are examples of normally gaseous monomers used according to this invention. Illustrative of liquid monomers used according to the present invention are alpha-olefins, such as 1-pentene, 4-methyl-1-pentene, 3-methyl-1-butene, 1-hexene, 4-methyl-1-hexene, 5-methyl-1-hexene, 5,5-dimethyl-1-hexene, 3-methyl - 1 - hexene, 3 - ethyl - 1 - hexene, 3 - ethyl - 1-heptene, 3,5,5-trimethyl-1-hexene, 4,6,6-trimethyl-1-heptene, 3,7-dimethyl-1-octene, and the like; dienes, such as isoprene, 1,2-pentadiene, 1,3-pentadiene, 1,5-hexadiene, conylene and the like. A mixture of two or more of the above monomers are used according to this invention also. Examples of the foregoing catalysts, polymerization, conditions, monomers, etc. are provided by pages 328 through 361 and 364 through 393 of "Linear and Stereoregular Addition Polymers" by Norman G. Gaylord and Herman F. Mark, Interscience Publishers, 1959, the contents of which are incorporated herein by reference.

A wide variety of amines are useful according to the present invention. It is necessary, however, that the amine contain at least one amino nitrogen atom. Moreover, the amine must contain at least one alkenyl radical which is terminally unsaturated. On the other hand, the addition salts of such amines with acids or acidic salts are used in place of the amines per se according to the present invention. One class of unsaturated amines which is especially suitable is that having the structure:

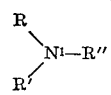

wherein each of R and R' is (1) a hydrogen, (2) a hydrocarbon group containing 1 to about 18 carbons, or (3) an aminohydrocarbon group wherein the amino-nitrogen thereof is attached to $N^1$ through at least one carbon, and up to twelve carbons, of a hydrocarbon group, or (4) wherein R and R' taken together with $N^1$ form an imidazolyl radical, and R" is a terminally unsaturated alkenyl radical containing 3 to about 14 carbons, preferably 5 to 10 carbon atoms.

For example, when R and R' are alkyl radicals there are included among the amine monomers of this invention, N,N-diethyl-allylamine, N,N-diethyl-4-pentenylamine, N,N-diethyl-allylamine-hydrochloride, N,N-diethyl-4-pentenylamine-hydrochloride, N,N-dilauryl-allylamine-sodium acid sulfate, N,N-dioctyl-4-pentenylamine, N,N-di-2-ethylhexyl-4-pentenylamine, N,N-di-2-ethylhexyl-4-pentenylamine-hydrobromide, N,N-dibutyl-3-butenylamine, N,N-dibutyl-2-methyl-4-pentenylamine, N,N-diethyl-2-methyl-3-butenylamine, N,N-diethyl-5-hexenylamine, N,N-dipropyl-3-methyl-5-hexenylamine, N,N-diethyl-2-methyl-5-hexenylamine, N,N-diethyl-2,2-dimethyl-5-hexenylamine, N,N-diethyl-4-ethyl-5-hexenylamine, N,N-dibutyl-5-ethyl-6-heptenylamine, N,N-diethyl-2,2,4-trimethyl-5-hexenylamine, N,N-diamyl-2,2,4-trimethyl-6-heptenylamine, N,N-diethyl-2,6-dimethyl-7-octenylamine, and the like. Acid addition salts of these amines with various acids and acid salts are useful in place of the amines, these acidic materials including HCl and HBr, illustrated above, as well as $H_2SO_4$, $NaHSO_4$, $H_3PO_4$, and the like.

Moreover, corresponding primary or secondary alkenyl amines and their addition salts are useful according to this invention, i.e., the compounds provided when one or both of the alkyl radicals of the foregoing compounds are omitted, e.g., 4-pentenylamine, N-ethyl-4-pentenylamine, allylamine, N-lauryl-4-pentenylamine-hydrochloride, 2,6-dimethyl-7-octenylamine, and the like. In a like manner, secondary and tertiary alkenylamines, and their addition salts, according to the foregoing compounds are useful according to this invention, e.g., diallylamine, N-ethyldiallylamine, di-4-pentenylamine, N-lauryl-di-4-pentenylamine-hydrochloride, bis-(2,2,4-trimethyl-6-heptenyl)-amine, and the like. Corresponding alkenyl diamines, and their addition salts, are useful according to this invention, i.e., when R or R' is an amino-hydrocarbon radical, e.g., N,N,N',N'-tetra-allyl-methylenediamine, N,N,N',N'-tetra-4-pentenyl-ethylenediamine, N,N,N',N'-tetra-3-butenyl-trimethylenediamine, and like alkylene diamines having alkenyl radicals corresponding to those illustrated above.

R and R' may be aryl or cycloalkyl; R may be aryl and R' may be cycloalkyl; R may be aryl and R' may be alkyl; or R may be alkyl and R' may be cycloalkyl. These embodiments include, for example, the following alkenyl amines: N-methyl-N-phenyl-4-pentenylamine, N-methyl-N-phenyl-allylamine, N-ethyl-N-phenyl-4-pentenylamine, N-lauryl-N-benzyl-4-pentenyl-amine, N-methyl-N-cyclohexyl-4-pentenylamine, N-methyl-N-phenyl-5-hexenylamine, N-ethyl-N-phenyl-2,6-dimethyl-7-octenylamine, N-butyl-N-phenyl-4-pentenylamine, N-methyl-N-α-naphthyl-4-pentenylamine, N-methyl-N-β-naphthyl-4-pentenylamine, and the like, as well as addition salts thereof.

In a further illustrative embodiment, R and R' together with $N^1$ form an imidazolyl radical to which the terminally unsaturated alkenyl radical is attached, e.g., 1-allyl-2-methyl-imidazole, 1-(4-pentenyl)-2-methyl-imidazole, 1-(4-pentenyl)-2-lauryl-imidazole-hydrobromide, 1-allyl-2-stearyl-imidazole-hydrochloride, 1-allyl-imidazole, 1-(4-pentenyl)-imidazole, 1-(2,2,4-trimethyl-6-heptenyl)-imidazole-hydrobromide, 1-allyl-2-hexyl-imidazole, 1-(4-pentenyl)-2-butyl-imidazole, the sulfuric acid solution salt of 1-allyl-2-(2-ethylhexyl)-imidazole, 1-(2,6-dimethyl-7-octenyl)-imidazole and like imidazoles, and addition salts thereof, having alkenyl radicals corresponding to those illustrated above, with or without alkyl substitution of 1 to 18 carbons.

A mixture of two or more of the foregoing alkenyl amines are used according to this invention also. The amount of the thermally unsaturated alkenylamine which is used according to this invention varies over a relatively wide range. In general, the amount used is determined by the intensity of color desired in the dyed or printed polymer. For example, 0.01 to 10.0 mol percent of the alkenylamine per mol of polymer formed is sufficient, 0.1 to 5.0 mol percent usually being preferred. On the other hand, when additional reactive sites are desired for other purposes, e.g., cross-linking, quantities greater than 10 mol percent may be used.

The following examples illustrate certain modes of operation of the present invention. These examples are not, however, limitations on the scope of the present invention, this being determined by the scope of the appended claims.

EXAMPLE 1

To a 1 gallon reactor was added 1265.5 cc. of hexane, 12.5 g. of titanium trichloride, 20.4 g. of N,N-diethyl-4-pentenylamine, and 21.9 cc. of triethyl-aluminum. After the reactor temperature had been brought to 160° F., 570 cc. of propylene was added causing the pressure to rise to 148 p.s.i.g. The temperature was maintained at 160 to 161° F. during the resulting polymerization reaction, and the pressure at 148 to 149 p.s.i.g. by periodic addition of propylene, the polymerization reaction proceeding at a rate of 1.28 lbs./gal./hr. After 73 minutes, propylene addition which had totaled 390 cc. was discontinued and the reaction killed with 800 cc. of methanol. After stirring for 1 hour, the methanol slurry was filtered, the filter cake repulped twice with methanol in a Waring Blendor and filtered. The recovered polymer was then extracted with pentane by slurrying therein for about 0.75 hour, filtered and dried, resulting in a solid polymer which was 13.9% by weight pentane-soluble. The pentane-insoluble polymer was 79.2 weight percent heptane-insoluble and had a melt index at 230° C. of 2.28. By contrast, polypropylene prepared under similar conditions is 22.0 weight percent pentane-soluble; its pentane-insoluble portion is 93.5 weight percent heptane-insoluble and it had a melt index at 230° C. of 0.11. On the other hand, the polymer prepared according to this example when subjected to infra-red analysis shows only one band which is not found in an infra-red analysis of polypropylene; this occurred at 3350 cm.$^{-1}$. In order to determine the nature of this product, 5 g. thereof were extracted as a slurry in 500 cc. of methanolic HCl (10% volume conc. HCl) on a steam bath for about 1 hour. When infra-red analysis was made on this extracted sample, the characteristic band at 3350 cm.$^{-1}$ remained. Moreover, polymer prepared as above, without the methanolic HCl extraction, retains this characteristic band in the infra-red after extraction by reflux with toluene for about 8 hours in a Soxhlet apparatus. (The melt indices described above were obtained by ASTM standard method D1238–52T using a temperature of 230° C. instead of 190° C.)

EXAMPLES 2–10

A dye bath was prepared by combining in 40 ml. of water, 1 g. of the resin to be dyed, 2 drops of a detergent (ethylene oxide-octylphenol condensation product containing 9 to 10 ethoxyl groups per molecule), 1 ml. of 6% acetic acid, 1 ml. of 6.6% aqueous $Na_2SO_4$, and 1 ml. of 1% aqueous dye solution (2 or 3 ml. for a 2 or 3% dye solution). The resin to be dyed was introduced into the dye bath at 120° F., the temperature being increased to the boiling point slowly and uniformly over a 20 minute period, and held at that point for 1 hour. The dyed resin was then filtered through a frittered glass funnel, sprayed with water to remove excess dye bath, then rinsed with a 0.25% solution of the foregoing detergent in warm water, washed with water and air-dried. The polymer powder compositions of Example 1, when dyed in this manner with Geigy Acid Milling Red G gave the following properties:

Table I

| Example | Polymer sample | Polymer color | Dye bath conc. |
|---|---|---|---|
| 2 | Polymer with normal purification.[1] | Bright red | 1% |
| 3 | Polymer with $CH_3OH \cdot HCl$ wash [2] and NaOH neutralization.[3] | do | 1% |
| 4 | Polymer with $CH_3OH \cdot HCl$ wash and $CH_3OH \cdot NH_4OH$ neutralization.[4] | do | 1% |
| 5 | Polymer with $CH_3OH \cdot HCl$ wash and $CH_3OH \cdot NH_4OH$ neutralization. | do | 2% |
| 6 | Polymer with $CH_3OH \cdot HCl$ wash and $CH_3OH \cdot NH_4OH$ neutralization. | do | 3% |
| 7 | Polymer with $C_3H_7OH \cdot HCl$ wash [5] and $CH_3OH \cdot NH_4OH$ neutralization. | do | 1% |
| 8 | Polymer with $C_3H_7OH \cdot HCl$ wash [5] and $CH_3OH \cdot NH_4OH$ neutralization. | do | 2% |
| 9 | Polymer with toluene Soxhlet extraction.[6] | do | 1% |
| 10 | Polypropylene per se | Very light pink stain. | 1% |

[1] Polymer of Example 1 with normal methanol and pentane purification procedures.
[2] Same as in (1) plus the methanolic HCl extraction of Example 1.
[3] Treated polymer slurried with 2% aqueous NaOH on steam bath for about 15 minutes, filtered, washed with water and dried.
[4] Treated polymer slurried with methanolic $NH_4OH$ (10% vol. conc. $NH_4OH$) on steam bath for about 15 minutes; filtered, washed with water and dried.
[5] Same as in (1) plus refluxing of polymer for 24 hours with isopropanolic (60% isopropanol-40% $H_2O$)-HCl (10 vol. percent conc. HCl); filter and wash with $H_2O$.
[6] Procedure described in Example 1.

The foregoing table illustrates that whereas the polymer compositions of this invention dyed readily, ordinary solid polypropylene took on virtually none of the dye utilized. At all of the 1% levels tested, the dye bath was nearly waterwhite after the dyed polymer compositions of this invention were removed therefrom by filtering. Whereas, at the 2 and 3% levels, exhaustion of the dye bath by these polymer compositions was not as complete, the shades assumed by the polymer powders were deeper.

EXAMPLE 11

The polymer of Example 1 was dyed in the same manner as in Example 4; however, National Aniline Alizarine Fast Blue RB was substituted as the dye of choice. The polymer powder resulting from this dyeing procedure was a bright blue shade, whereas polypropylene per se in powder form, prepared in the absence of the alkenylamine, exhibited only an extremely light blue stain.

EXAMPLES 12–15

Propylene and N,N-diethyl-4-pentenylamine were polymerized in manner described in Example 1 as illustrated by Table II.

Table II

| Example | $TiCl_3$ g./100 cc. of hexane | Propylene, p.s.i.g. | Temp., °F. | Mol ratio, Al/Ti/amine | Pentane-insoluble polymer, lbs./gal./hr. |
|---|---|---|---|---|---|
| 12 | 1.0 | 115 | 160 | 2/1/1.8 | 0.92 |
| 13 | 0.5 | 140 | 150 | 2/1/1.8 | 1.14 |
| 14 | 0.25 | 140 | 160 | 2/1/1.8 | 1.17 |
| 15 | 0.06 | 140 | 160 | 2/1/0 | 0.20 |

The polymers prepared according to these examples were purified and dyed with Acid Milling Red in a 1% dye bath in accordance with the procedures described in Examples 1–10, giving the properties tabulated in Table III, part A of each example being given the purification described in Example 2, and part B the purification of Example 4.

Table III

| Example | Total polymer, percent pentane-soluble | Pentane-insoluble polymer | | |
|---|---|---|---|---|
| | | Percent heptane-insoluble | Melt index at 230° C. | Polymer color |
| 12A | 14.6 | 80.1 | | Bright red. |
| 12B | | | | Do. |
| 13A | 19.2 | 88.6 | 0.65 | Do. |
| 13B | | | | Do. |
| 14A | 9.6 | 92.2 | | Do. |
| 14B | | | | Do. |
| 15 | 22.0 | 93.5 | 0.11 | Very light pink stain. |

EXAMPLES 16–17

Diallylamine and propylene were polymerized in the manner described in Example 1 as illustrated by Table IV.

Table IV

| Example | $TiCl_3$ g./100 cc. of hexane | Propylene, p.s.i.g. | Temp., °F. | Mol ratio, Al/Ti/amine | Pentane-insoluble polymer, lbs./gal./hr. |
|---|---|---|---|---|---|
| 16 | 1.0 | 125 | 160 | 2.2/1/1.8 | 0.79 |
| 17 | 0.1 | 140 | 160 | 2/1/0 | 0.42 |

These polymers were purified and dyed by the techniques described in Examples 12–15, the results thereof being illustrated in Table V.

Table V

| Example | Total polymer, percent pentane-soluble | Pentane-insoluble polymer | |
|---|---|---|---|
| | | Percent heptane-insoluble | Polymer color |
| 16A | 4.3 | 96.6 | Bright red. |
| 16B | | | Red. |
| 17 | 20.3 | 91.5 | Very light pink stain. |

Example 16A was given purification of Example 2; Example 16B given the purification of Example 4 was a slightly less bright shade.

EXAMPLE 18

Ethylene and N,N-diethyl-4-pentenylamine are polymerized and dyed substantially in the manner described in Examples 1 and 2 giving a polymer powder having a red color.

EXAMPLES 19–21

Propylene and 1-allyl-2-methyl-imidazole were polymerized in the manner described in Example 1 as illustrated by Table VI.

Table VI

| Example | $TiCl_3$ g./100 cc. of hexane | Propylene, p.s.i.g. | Temp., °F. | Mol ratio, Al/Ti/amine | Pentane-insoluble polymer, lbs./gal./hr. |
|---|---|---|---|---|---|
| 19 | 1.0 | 114 | 160 | 2/1/1.8 | 1.31 |
| 20 | 0.5 | 167 | 160–169 | 2/1/1.8 | 1.68 |
| 21 | 0.1 | 140 | 160 | 2/1/0 | 0.42 |

The foregoing polymers were purified and dyed by the techniques described in Examples 12–15, the results thereof being illustrated in Table VII.

Table VII

| Example | Total polymer, percent pentane-soluble | Pentane-insoluble polymer | |
|---|---|---|---|
| | | Percent heptane-insoluble | Polymer color |
| 19A | Trace | 89.3 | Bright red. |
| 19B | | | Red. |
| 20 | 33.8 | 98.9 | Red. |
| 21 | 20.3 | 91.5 | Very light pink stain. |

19A and B purified in same manner as 16A and B respectively; 20 purified in same manner as Example 7.

EXAMPLES 22–24

Propylene and N,N-diallylaniline were polymerized in the manner described in Example 1; this is illustrated in Table VIII as Example 22. Propylene and N,N-diallylpiperazine were polymerized in the manner described in Example 1, this procedure being illustrated in Table VIII, as Example 23.

Table VIII

| Example | $TiCl_3$ g./100 cc. of hexane | Propylene, p.s.i.g. | Temp., °F. | Mol ratio, Al/Ti/amine | Pentane-insoluble polymer, lbs./gal./hr. |
|---|---|---|---|---|---|
| 22 | 0.5 | 140 | 160 | 2/1/1.8 | 0.30 |
| 23 | 0.5 | 140 | 160 | 6/1/1.8 | 0.16 |
| 24 | 0.1 | 140 | 160 | 2/1/0 | 0.42 |

The foregoing polymers were dyed according to the technique of Example 2 giving the results tabulated in Table IX.

Table IX

| Example | Total polymer, percent pentane-soluble | Pentane-insoluble polymer | |
|---|---|---|---|
| | | Percent heptane-insoluble | Polymer color |
| 22 | 4.3 | 98.2 | Red. |
| 23 | 9.0 | 96.5 | Bright red. |
| 24 | 20.3 | 91.5 | Very light pink stain. |

EXAMPLE 25

Propylene, 4-pentenylamine and ethylene are polymerized in the presence of $VOCl_3$ and aluminum triisobutyl in substantially the manner described in Example 1. The polymer formed is cross-linked, on the one hand, with maleic acid and, on the other hand, with toluene diisocyanate.

EXAMPLES 26–28

Propylene and N,N,N',N'-tetra-allylmethylenediamine were polymerized in the manner described in Example 1 and as illustrated in Table X.

Table X

| Example | $TiCl_3$ g./100 cc. of hexane | Propylene, p.s.i.g. | Temp., °F. | Mol ratio, Al/Ti/amine | Pentane-insoluble polymer, lbs./gal./hr. |
|---|---|---|---|---|---|
| 26 | 1.0 | 110 | 160 | 4/1/3.6 | 0.12 |
| 27 | 0.1 | 135 | 160 | 2/1/1 | 0.12 |
| 28 | 0.1 | 140 | 160 | 2/1/0 | 0.42 |

The resulting polymers were purified and dyed by the techniques described in Examples 12–15 giving the properties illustrated in Table XI.

Table XI

| Example | Total polymer, percent pentane-soluble | Pentane-insoluble polymer | |
|---|---|---|---|
| | | Percent heptane-insoluble | Polymer color |
| 26A | 8.2 | 91.0 | Pastel red. |
| 26B | | | Do. |
| 27A | 5.6 | 96.4 | Do. |
| 27B | | | Do. |
| 28 | 20.3 | 91.5 | Very light pink stain. |

EXAMPLE 29

4-methyl-1-pentene is polymerized in the presence of $TiCl_4$, $Al(C_2H_5)_3$ and N,N-diethyl-4-pentenylamine in substantially the manner described in Example 1. However, this procedure is conducted at autogenous pressure and under the conditions, and with the quantities and concentrations, tabulated in Table XII.

Table XII

| $TiCl_4$/heptane, g./100 cc. | Al/Ti/amine, molar ratio | Temp., °F. | 4-methyl-1-pentene/heptane, parts by volume |
|---|---|---|---|
| 1.0 | 2/1/1.8 | 125 | 40/100 |

This polymer is dyed according to the technique of Example 2 giving a red powder.

EXAMPLE 30

Into a 200 ml. pressure bottle, 60 ml. of dry n-hexane, 2.8 mmol of $(C_2H_5)_3Al$, 28.5 mmol of N-methyl-N-phenyl-4-pentenylamine and 1.0 mmol of $TiCl_3$ were added under dry-$N_2$. The mixture was aged at 70° C. for five minutes and propylene was polymerized with the mixture at 70° C. and 40 p.s.i.g. for one hour. Propylene was then shut off and the mixture was stirred at 70° C. for five hours. At the end of the reaction, the catalyst was destroyed by adding 10 ml. of methanol and 40 ml. of n-hexane to the reaction mixture. The polymer was broken up by a blender and washed repeatedly with methanol, hot isopropanol and methanol. It was identified by infra-red to be a copolymer of propylene and the amine. Yield: 5.2 g., N%=1.86.

The polymer dyed well with wool-fast blue, and was soap and dry-cleaning ($CCl_4$) fast.

EXAMPLE 31

The procedure of Example 30 was repeated with the following modifications:

1.5 mmol $(C_2H_5)_3Al$
68.4 mmol amine

Propylene was charged into the bottle at 70° C. and 40 p.s.i.g. for 10 minutes and then shut off. The reaction mixture was left in the 70° C. bath and stirred until the pressure in the bottle dropped to 15 p.s.i.g. (about 80 minutes). The bottle was refilled with propylene to 40 p.s.i.g. The process was repeated 4 times. At the end of the reaction, the reaction mixture was destroyed with a mixture of 40 ml. of n-hexane, 20 ml. of methanol and 10 ml. of isopropanol. The polymer was washed thoroughly and repeatedly with methanol and isopropanol in a blender. Yield: 12.2 g., N%=3.07.

EXAMPLES 32–35

Example 30 was repeated using 3 mmol of triethyl aluminum. After shutting off the propylene, the reaction mixture was stirred for about 16 hours. The quantities of the amine charged, the yield of hexane-insoluble polymer, weight percent nitrogen and ash percent are tabulated in Table XIII.

Table XIII

| Example | Amine (mmol) | Yield (g.) | N, Percent | Ash, Percent |
|---|---|---|---|---|
| 32 | 11.4 | 3.9 | 0.94 *0.89 | 2.43 *0.037 |
| 33 | 17.1 | 5.4 | 1.11 *0.98 | 1.71 *0.045 |
| 34 | 22.8 | 5.8 | 1.35 *1.37 | 1.49 *0.156 |
| 35 | 28.5 | 5.0 | | |

*Ash, percent and N, percent after the polymer was washed with CH₃OH—10% HCl and CH₃OH—10% NaOH.

EXAMPLE 36

Example 30 was repeated using 5.22 mmol of diethyl aluminum chloride, and the polymerization reaction run for 3 hours. Yield was 5.3 g. and percent N was 0.89.

EXAMPLE 37

Example 35 was repeated using 3.5 mmol of diethyl aluminum chloride instead of triethyl aluminum. Propylene was shut off after 3 hours reaction and the reaction mixture stirred thereafter for about 16 hours. Yield was 4.5 g.; percent N was 0.89 and percent ash was 0.61. The resulting amine-propylene polymer dyed well with woolfast blue.

EXAMPLES 38–40

Example 37 was repeated using the quantities of N-methyl-N-phenyl-4-pentenylamine tabulated in Table XIV. In these examples the diethyl aluminum chloride and TiCl₃ were mixed in n-hexane and the amine was then added thereto. This mixture was aged at 67° C. for 5 minutes and the propylene was charged to the reactor at 67° C. and 40 p.s.i.g. for 2.5 hours. At this point propylene was turned off and the reaction mixture was stirred for about 16 hours at 67° C.

Table XIV

| Example | Amine (mmol) | Yield (g.) | CH₃OH—i-C₃H₇OH, Washed | | CH³OH—10% HCl and CH₃OH—10% NaOH, Washed | |
|---|---|---|---|---|---|---|
| | | | Ash% | N% | Ash% | N% |
| 38 | 17.1 | 5.6 | 1.12 | 0.70 | 0.029 | 0.72 |
| 39 | 22.8 | 4.8 | 2.21 | 0.68 | None | 0.80 |
| 40 | 28.5 | 4.5 | 2.01 | 0.75 | 0.116 | 0.70 |

EXAMPLES 41–48

Example 30 was repeated in 50 ml. of n-hexane, substituting the quantities of N-methyl-N-phenyl-allylamine set forth in Table XV. Aging took place at 70° C. for 30 minutes and the polymerization reaction at 70° C. for 6 hours. In Table XV, DEAC refers to diethyl aluminum chloride and TEA to triethyl aluminum.

Table XV

| Example | Catalyst-Al Component (mmol) | Amine (mmol) | Yield (g.) |
|---|---|---|---|
| 41 | DEAC (2.0) | 12.8 | 3.6 |
| 42 | DEAC (2.0) | 25.6 | 3.4 |
| 43 | DEAC (3.9) | 12.8 | 3.2 |
| 44 | TEA (1.4) | 12.8 | 3.2 |
| 45 | TEA (2.1) | 12.8 | 4.4 |
| 46 | TEA (2.1) | 25.6 | 3.0 |
| 47 | TEA (2.8) | 12.8 | 3.5 |
| 48 | TEA (5.2) | 12.8 | 5.4 |

The invention claimed is:

1. A composition consisting essentially of a highly crystalline linear interpolymer selected from the group consisting of random copolymers and block copolymers wherein from about 0.01 to about 10 mol percent of the recurring units thereof in their monomeric form are (I) at least one nitrogen compound selected from the group consisting of (A) an amine containing at least one amino group and at least one terminally unsaturated alkenyl radical containing 3 to 14 carbon atoms, and (B) the addition salts of said nitrogen compound, and the remainder of said recurring units in their monomeric form are (II) at least one terminally unsaturated olefin having the formula: CH₂=CHR wherein R is selected from the group consisting of hydrogen and an alkyl radical containing 1 to 8 carbon atoms.

2. The composition of claim 1 wherein said interpolymer consists essentially of a block copolymer.

3. The composition of claim 2 wherein said nitrogen compound is one having the formula:

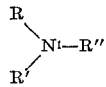

wherein each of R and R' is selected from the group consisting of (A) hydrogen, (B) a hydrocarbon group containing 1 to 18 carbons, (C) an amino hydrocarbon group wherein the amino nitrogen thereof is attached to N¹ through a hydrocarbon group containing 1 to about 12 carbons, and (D) wherein R and R' taken together with N¹ form an imidazolyl radical; and R'' is a terminally unsaturated alkenyl radical containing 3 to about 14 carbons.

4. The composition of claim 3 wherein said olefin is propylene.

5. The composition of claim 4 wherein said nitrogen compound constitutes about 0.1 to about 5 mol percent of said composition.

6. The composition of claim 4 wherein said nitrogen compound is N,N-diethyl-4-pentenylamine.

7. The composition of claim 4 wherein said nitrogen compound is 1-allyl-2-methyl-imidazole.

8. The composition of claim 4 wherein said nitrogen compound is N-methyl-N-phenyl-4-pentenylamine.

9. The composition of claim 4 wherein said nitrogen compound is N-methyl-N-phenyl-allylamine.

10. A process for preparing a dyeable and printable polymeric composition which comprises contacting under polymerizing conditions at least on terminally unsaturated olefin having the formula:

$$CH_2=CHR$$

wherein R is selected from the group consisting of hydrogen and alkyl radicals containing 1 to 8 carbons, in the presence of (I) at least one nitrogen compound selected from the group consisting of (a) an amine containing at least one amino group and at least one terminally unsaturated alkenyl radical having 3 to about 14 carbons and (b) the addition salts of said nitrogen compound, and (II) a coordination complex catalyst capable of polymerizing propylene to solid isotactic polymers, and recovering a highly crystalline linear interpolymer, selected from the group consisting of random copolymers and block copolymers, containing between about 0.01 and about 10 mol percent of nitrogen, said catalyst comprising (A) a halide of a metal selected from the group consisting of titanium, zirconium, hafnium, vanadium, niobium, chromium, molybdenum and tungsten and (B) an activator therefore selected from the group consisting of metal alkyls, metal hydrides, metal borohydrides, and alkyl metal halides wherein said metal is selected from the group consisting of aluminum, zinc, beryllium, chromium, magnesium, lithium, sodium, potassium and lead.

11. The process of claim 10 wherein said interpolymer is a block copolymer.

12. The process of claim 11 wherein said nitrogen compound is one having the general formula:

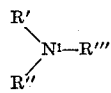

wherein each of R' and R" is selected from the group consisting of (1) hydrogen, (2) a hydrocarbon group containing 1 to about 18 carbons, (3) an amino hydrocarbon group wherein the amino nitrogen thereof is attached to $N^1$ through a hydrocarbon group containing 1 to 12 carbons, and (4) wherein R' and R" taken together with $N^1$ form an imidazolyl radical; and R''' is a terminally unsaturated alkenyl radical containing from 3 to about 14 carbons.

13. The process of claim 12 wherein said olefin is propylene.

14. The process of claim 13 wherein said nitrogen compound constitutes about 0.1 to about 5 mol percent of said composition.

15. The process of claim 13 wherein said nitrogen compound is N,N-diethyl-4-pentenylamine.

16. The process of claim 13 wherein said nitrogen compound is 1-allyl-2-methyl-imidazole.

17. The process of claim 13 wherein said nitrogen compound is N-methyl-N-phenyl-4-pentenylamine.

18. The process of claim 13 wherein said nitrogen compound is N-methyl-N-phenyl-allylamine.

No references cited.

JOSEPH L. SCHOFER, *Primary Examiner.*

M. B. KURTZMAN, *Assistant Examiner.*